United States Patent
Sekine et al.

(10) Patent No.: US 9,604,570 B2
(45) Date of Patent: Mar. 28, 2017

(54) SOUND GENERATING DEVICE FOR VEHICLE

(71) Applicant: HONDA MOTOR CO., LTD., Tokyo (JP)

(72) Inventors: Ryuichi Sekine, Wako (JP); Hirotomi Nemoto, Wako (JP); Michiyo Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 14 days.

(21) Appl. No.: 14/621,858

(22) Filed: Feb. 13, 2015

(65) Prior Publication Data

US 2015/0232025 A1 Aug. 20, 2015

(30) Foreign Application Priority Data

Feb. 14, 2014 (JP) .................................. 2014-026421

(51) Int. Cl.
| | |
|---|---|
| *G10H 1/16* | (2006.01) |
| *B60Q 5/00* | (2006.01) |
| *G10H 5/10* | (2006.01) |
| *G10K 15/02* | (2006.01) |

(52) U.S. Cl.
CPC .............. *B60Q 5/005* (2013.01); *G10H 5/10* (2013.01); *G10K 15/02* (2013.01); *B60Q 5/00* (2013.01); *G10H 2250/381* (2013.01)

(58) Field of Classification Search
CPC ...... H04R 2499/13; H04R 5/02; G10K 15/02; G10H 5/10; G10H 2250/381; B60Q 5/005; B60Q 5/00

USPC ............................................ 381/86, 61, 302
See application file for complete search history.

(56) References Cited

U.S. PATENT DOCUMENTS

| | | | | |
|---|---|---|---|---|
| 6,152,255 A | * | 11/2000 | Noro ....................... | B62D 6/007 180/443 |
| 2008/0192954 A1 | * | 8/2008 | Honji ..................... | G10K 15/04 381/86 |
| 2011/0066428 A1 | * | 3/2011 | Yang .................... | G10L 21/0208 704/225 |
| 2013/0230185 A1 | * | 9/2013 | Osawa ..................... | B60Q 5/00 381/86 |

FOREIGN PATENT DOCUMENTS

JP 2011-230724 A 11/2011

* cited by examiner

*Primary Examiner* — Disler Paul
(74) *Attorney, Agent, or Firm* — Westerman, Hattori, Daniels & Adrian, LLP (57) ABSTRACT

There is provided a sound generating device for vehicles that is capable of improving the sensing of acceleration feeling. The sound generating device for vehicles includes an input unit that receives an input of a speed of a vehicle; and a generation unit that generates a sound including a plurality of frequency components when the speed of the vehicle is a first speed. When the speed of the vehicle changes from the first speed to a second speed (higher than the first speed), the generation unit shifts the frequency components included in the sound to a higher frequency side and reduces the sound at a higher frequency band in the shifted frequency components. The generation unit preferably performs pitch shift processing and low pass filter processing (and more preferably performs moving average processing) on the sound.

16 Claims, 5 Drawing Sheets

SOUND GENERATING DEVICE FOR VEHICLE

CROSS REFERENCES TO RELATED APPLICATIONS

The present application claims priority under 35 U.S.C. §119 to Japanese Patent Application No. 2014-026421, filed Feb. 14, 2014, entitled "Sound Generating Device for Vehicle." The contents of this application are incorporated herein by reference in their entirety.

TECHNICAL FIELD

The present disclosure relates to a device (that is, a sound generating device for vehicles) that generates sound to be transmitted to a person (for example, a pedestrian, a passenger) near a vehicle and/or in a vehicle cabin.

BACKGROUND

For example, FIG. 2 in Japanese Unexamined Patent Application Publication (JP-A) No. 2011-230724 illustrates a sound emitting device for vehicles as a sound generating device for vehicles, and the sound emitting device for vehicles of JP-A No. 2011-230724 is equipped with a controller U connected to a vehicle speed sensor 11 and speakers 1F, 1S, and 1R. Here, the sound emitting device for vehicles of JP-A No. 2011-230724 is applied to a vehicle V of FIG. 1 in JP-A No. 2011-230724. According to the description in paragraph[0030] of JP-A No. 2011-230724, the frequency characteristics of sound outputted from the speakers 1F, 1S, and 1R of JP-A No. 2011-230724 may be shifted to the high frequency side as the vehicle speed detected by the vehicle speed sensor 11 of JP-A No. 2011-230724 increases. In this manner, when such a sound is heard by people, acceleration feeling regarding the sound (or accelerating vehicle V) is improved and a sense of incongruity is reduced. In other words, if the frequency characteristics of sound outputted from the speakers 1F, 1S, and 1R of JP-A No. 2011-230724 are not shifted to the high frequency side, a sense of incongruity occurs that is caused by the difference between a vehicle speed sensed according to the sound (sound with constant frequency characteristics from the accelerating vehicle V) and the actual vehicle speed of the vehicle V.

SUMMARY

The inventors have found that when sound having frequency characteristics shifted to the high frequency side is heard by people, sensing of acceleration feeling regarding the sound becomes worse. In other words, the inventors have found that a sense of incongruity is caused by the difference between the tone of sound (the first sound) having frequency characteristics before being shifted to the high frequency side and the tone of sound (the last sound) having frequency characteristics after being shifted to the high frequency side.

The present disclosure provides a sound generating device for vehicles that is capable of improving the sensing of acceleration feeling. The advantage of the present disclosure will be apparent to those skilled in the art with reference to the aspects, the preferred embodiment, and the accompanying drawings exemplified below.

Several aspects of the present disclosure will be exemplified below to facilitate understanding of the present disclosure.

In a first aspect, a sound generating device for vehicles includes: an input unit that receives an input of a speed of a vehicle; and a generation unit that generates a sound including a plurality of frequency components when the speed of the vehicle is a first speed. When the speed of the vehicle changes from the first speed to a second speed which is higher than the first speed, the generation unit shifts the frequency components to a high frequency side and reduces a high frequency band in the shifted frequency components.

In the first aspect, when the vehicle speed increases, the sound is shifted to the high frequency side. In addition, in the first aspect, the sound generating device for vehicles reduces a high frequency band included in the sound which has been shifted to the high frequency side. When such a sound is heard by people, acceleration feeling regarding the sound (or accelerating vehicle) is improved and a sense of incongruity is reduced which is due to the difference (e.g., at high frequency band) between the tone of sound (a first sound) before being shifted to the high frequency side and the tone of sound (a second sound) having frequency characteristics after being shifted to the high frequency side. In this manner, it is possible to provide a sound generating device for vehicles that is capable of improving the sensing of acceleration feeling.

In a second aspect, the generation unit may increase the width of the high frequency band as the difference between the first speed and the second speed increases.

In the second aspect, when the vehicle speed increases, the width of the reduced high frequency band is increased. In this manner, it is possible to provide a sound generating device for vehicles that is capable of further improving the sensing of acceleration feeling.

In a third aspect, the generation unit may shift the frequency components to the high frequency side by performing pitch shift processing on the sound.

In the third aspect, when the vehicle speed increases, pitch shift processing is performed so as to increase the pitch of the sound. In this manner, it is possible to shift the sound to the high frequency side by pitch shift processing.

In a fourth aspect, the generation unit may reduce the high frequency band in the shifted frequency components by performing low pass filter processing on the sound.

In the fourth aspect, it is possible to reduce the high frequency band (high frequency components) of the sound which has been shifted to the high frequency side by the low pass filter processing.

In a fifth aspect, the low pass filter processing may be moving average processing.

In the fifth aspect, it is possible to synthesize sound by utilizing not only the current sound but also delayed sound. In this manner, the low pass filter processing may be formed by the moving average processing.

In a sixth aspect, the generation unit may increase a sampling number used in the moving average processing as the difference between the first speed and the second speed increases.

In the sixth aspect, when the vehicle speed increases, the sampling number used in the moving average processing is increased. In this manner, when the vehicle speed increases, the width of the reduced high frequency band may be easily increased.

Those skilled in the art would readily appreciate that the exemplified aspects of the present disclosure may be further modified without departing from the spirit of the present disclosure.

DESCRIPTION OF THE PREFERRED EMBODIMENTS

The preferred embodiment described below is provided to facilitate understanding of the present disclosure. Therefore, those skilled in the art should recognize that the present disclosure is not necessarily limited to the embodiment described below.

Figure 1:
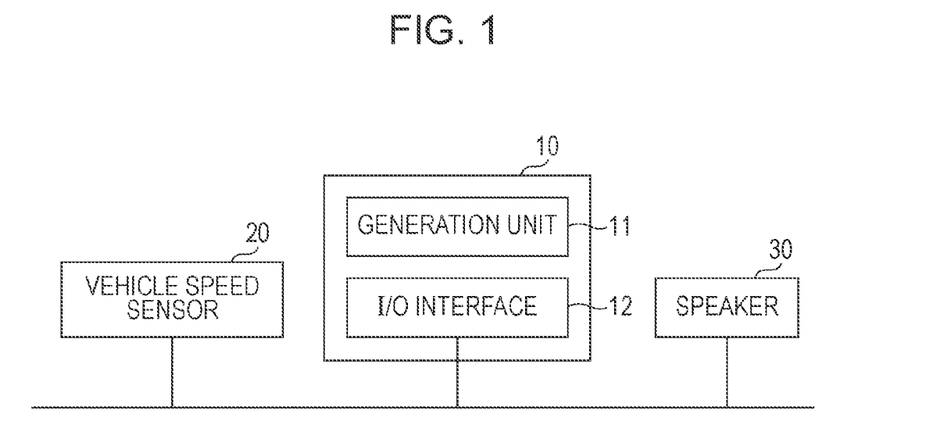
FIG. 1 illustrates a configuration example of a sound generating device for vehicles according to an embodiment of the present disclosure.

FIG. 1 illustrates a configuration example of a sound generating device for vehicles according to one embodiment of the present disclosure. As illustrated in FIG. 1, a sound generating device 10 for vehicles includes a generation unit 11 and an I/O interface 12. The sound generating device 10 for vehicles is provided in a vehicle (not illustrated) such as an automobile and is connected to a vehicle speed sensor 20 that detects a speed of the vehicle. In addition, the sound generating device 10 for vehicles is connected to a speaker 30 that transmits or emits sound to a person (for example, a pedestrian, a passenger) near the vehicle and/or in the vehicle cabin. It is to be noted that the I/O interface 12 may be formed with, for example, a communication unit, in other words, an input unit of the sound generating device 10 for vehicles or the I/O interface 12 (communication unit) may receive an input of the speed of the vehicle from the vehicle speed sensor 20 via an in-vehicle network such as CAN. Similarly, an output unit of the sound generating device 10 for vehicles or the I/O interface 12 (communication unit) may output sound (sound signal) to the speaker 30 via an in-vehicle network such as CAN.

The generation unit 11 of FIG. 1 may generate sound to be outputted by the speaker 30 according to the vehicle speed from the vehicle speed sensor 20. Specifically, when the vehicle speed is higher than or equal to a first threshold value (for example, 0.5 [km/h]), the generation unit 11 may generate a sound signal (sound including a plurality of frequency components) from sound source data, for example. Here, the generation unit 11 is able to shift the frequency components to the high frequency side and to reduce a high frequency band in the shifted frequency components as the vehicle speed increases. A sound at high frequency band in the shifted frequency components is reduced or decreased. A sound at high frequency band in the shifted frequency components may be slightly reduced or decreased, or may be completely reduced to zero.

With the sound generating device 10 for vehicles or the generation unit 11, the sound is shifted to the high frequency side when the vehicle speed increases. In addition, the sound generating device 10 for vehicles or the generation unit 11 reduces a high frequency band included in the sound which has been shifted to the high frequency side. When such a sound is heard by people, acceleration feeling regarding the sound (or accelerating vehicle) is improved and a sense of incongruity is reduced which is due to the difference (e.g., at high frequency band) between the tone of sound (the first sound) before being shifted to the high frequency side and the tone of sound (the second sound) having frequency characteristics after being shifted to the high frequency side. In this manner, it is possible to provide the sound generating device 10 for vehicles which is capable of improving the sensing of acceleration feeling.

Figure 2:
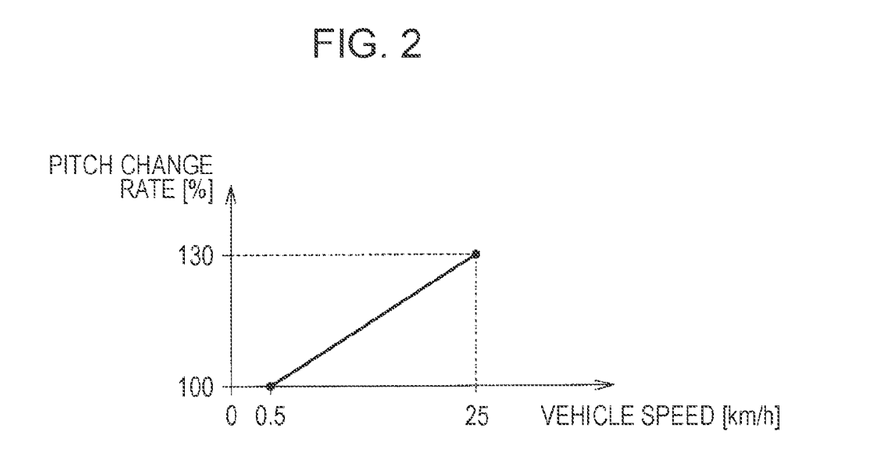
FIG. 2 illustrates an explanatory diagram of pitch shift processing performed by a generation unit of FIG. 1.

FIG. 2 illustrates an explanatory diagram of pitch shift processing performed by the generation unit 11 of FIG. 1. When frequency components are shifted to the high frequency side, the generation unit 11 of FIG. 1 is able to perform, for example, pitch shift processing on sound signals (sound including the frequency components). As illustrated in FIG. 2, when the vehicle speed increases, the generation unit 11 is able to increase the pitch of sound. Specifically, when the vehicle speed is in a predetermined range (for example, 0.5 to 25 [km/h]), a pitch change rate may be set according to the vehicle speed. As an example, when the vehicle speed is 0.5 [km/h], the pitch change rate is set to, for example, 100[%]. In other words, when the vehicle speed is 0.5 [km/h], the generation unit 11 is able to use sound source data as it is or reproduce sound source data at a predetermined rate. It is to be noted that when the pitch shift processing is, for example, digital processing, the generation unit 11 may perform, for example, a sample rate conversion processing on the sound source data as the pitch shift processing.

Next, when the vehicle speed is, for example, 25 [km/h], the pitch change rate is set to, for example, 130[%]. In other words, when the vehicle speed is 25 [km/h], the generation unit 11 is able to perform pitch shift processing on the sound source data so that the pitch of the sound generated by the sound source data is increased by 1.3 times. An increase in the pitch change rate varies directly with an increase in the vehicle speed in a predetermined range (for example, 0.5 to 25 [km/h]) (see FIG. 2).

That is, when the vehicle speed is, for example, 1.5 [km/h] which is increased from a first threshold value (for example, 0.5 [km/h]) by 1 [km/h] as an example, the pitch change rate is given by 100[%]+(30[%]/(25 [km/h]-0.5 [km/h])×1 [km/h]=101[%], for example. Similarly, when the vehicle speed is a second threshold value (for example, 10 [km/h]), a third threshold value (for example, 15 [km/h]), or a fourth threshold value (for example, 20 [km/h]), the pitch change rate is, for example, 112[%], 118[%], or 124[%], respectively.

When the vehicle speed is higher than or equal to the first threshold value (for example, 0.5 [km/h]) and lower than the second threshold value (for example, 10 [km/h]), the generation unit 11 of FIG. 1 is able to determine a pitch change rate (for example, 100 to 112[%]) according to the vehicle speed and to perform pitch shift processing on the sound source data with the determined pitch change rate. That is, with the pitch change rate (for example, 100 to 112[%]) based on the vehicle speed, the generation unit 11 is able to convert the sound (the sound source data, the first sound) before being shifted to the high frequency side to the sound (the second sound) which has the frequency characteristics after being shifted to the high frequency side. When the vehicle speed is a low speed (for example, 0.5 to 10 [km/h]), a sense of incongruity is low which is due to the difference (high frequency band) between the tone of sound (the first sound) before being shifted to the high frequency side and the tone of sound (the second sound) having the frequency characteristics after being shifted to the high frequency side, and thus the generation unit 11 is able to output the sound (the second sound) as it is, which has the frequency characteristics after being shifted to the high frequency side, via the speaker 30.

Next, when the vehicle speed is higher than or equal to the second threshold value (for example, 10 [km/h]) and lower than the third threshold value (for example, 15 [km/h]), the generation unit 11 of FIG. 1 is able to determine a pitch change rate (for example, 112 to 118[%]) according to the vehicle speed and to perform pitch shift processing on the sound source data with the determined pitch change rate. That is, with the pitch change rate (for example, 112 to 118[%]) based on the vehicle speed, the generation unit 11 is able to convert the sound (the sound source data, the first sound) before being shifted to the high frequency side to the sound (the second sound) which has the frequency characteristics after being shifted to the high frequency side (see FIG. 3A).

Figure 3A:
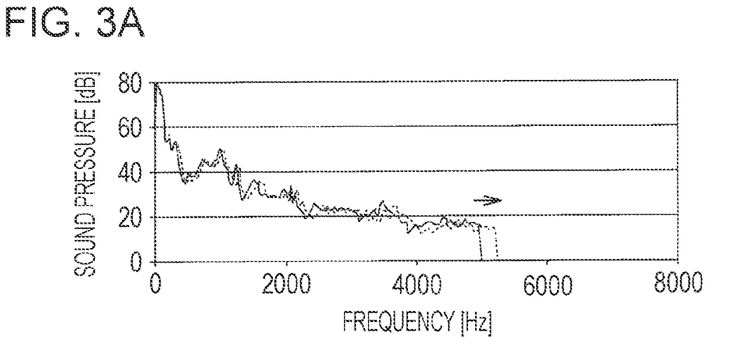
FIG. 3A illustrates respective explanatory diagrams of sound having frequency characteristics before and after being shifted to a high frequency side when the speed of a vehicle changes from a first speed to a second speed (for example, 10 to 15 [km/h])

FIG. 3A illustrates respective explanatory diagrams of the sound (the sound source data, the first sound) before being shifted to the high frequency side and the sound (the second sound) having the frequency characteristics after being shifted to the high frequency side when the vehicle speed changes from the first speed (for example, 0.5 [km/h]) to the second speed (for example, 10 to 15 [km/h]). The solid line in FIG. 3A indicates the frequency characteristics of the first sound (the sound source data) when the vehicle speed is, for example, 0.5 [km/h] (the first speed=the first threshold value) and the pitch change rate is, for example, 100[%]. Also, the dotted line in FIG. 3A indicates the frequency characteristics of the second sound when the vehicle speed is, for example, 10 [km/h] (the second speed=the second threshold value) and the pitch change rate is, for example, 112[%].

When the vehicle speed is a middle speed (for example, 10 to 15 [km/h]), a sense of incongruity is not low which is due to the difference (high frequency band) between the tone of the first sound (the sound before being shifted to the high frequency side) as indicated as an example by the solid line in FIG. 3A and the tone of the second sound (the sound having the frequency characteristics after being shifted to the high frequency side) as indicated as an example by the dotted line in FIG. 3A. Thus, the generation unit 11 does not output the sound (the second sound) as it is, the sound having the frequency characteristics after being shifted to the high frequency side, and the generation unit 11 is able to reduce a high frequency band in the shifted frequency components. Specifically, the generation unit 11 is able to perform filter processing having the filter characteristic for example as illustrated in FIG. 3B on the second sound (the sound having the frequency characteristics after being shifted to the high frequency side).

Figure 3B:
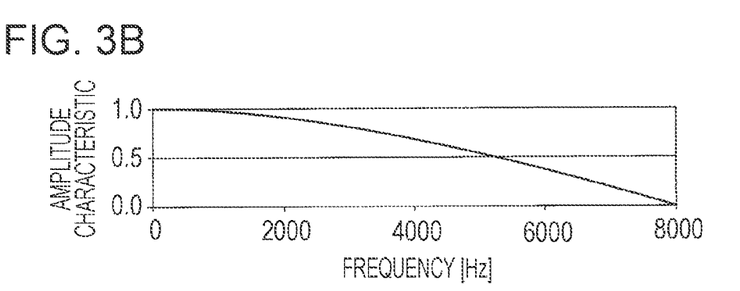
FIG. 3B illustrates a first filter characteristic.
Figure 3C:
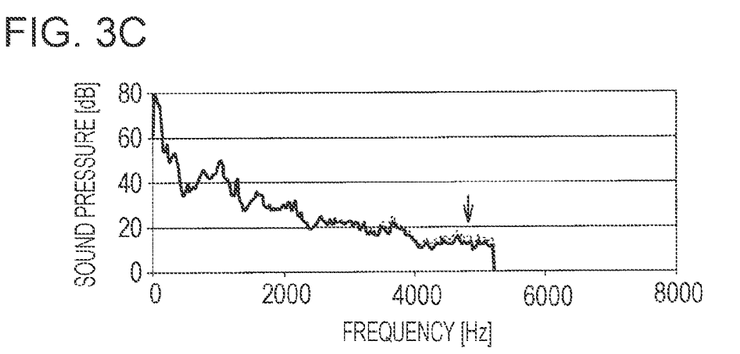
FIG. 3C illustrates respective explanatory diagrams of sound having frequency characteristics before and after undergoing filter processing when the vehicle speed changes from the first speed to the second speed.

FIG. 3B illustrates a first filter characteristic, and FIG. 3C illustrates respective explanatory diagrams of the sound (the second sound which has the frequency characteristics after being shifted to the high frequency side) having frequency characteristics before undergoing filter processing and the sound (a third sound which is shifted to the high frequency side and has frequency characteristics after undergoing filter processing) having the frequency characteristics after undergoing filter processing when the vehicle speed changes from the first speed (for example, 0.5 [km/h]) to the second speed (for example, 10 to 15 [km/h]). Here, the dotted line in FIG. 3C matches the dotted line in FIG. 3A. The solid line (thick solid line) in FIG. 3C indicates the frequency characteristics of the third sound when the vehicle speed is, for example, 10 [km/h] (the second speed=the second threshold value), the pitch change rate is, for example, 112[%], and the filter characteristic is, for example, the first filter characteristic of FIG. 3B.

For example, as illustrated by the solid line in FIG. 3C, a high frequency band (for example, 3000 to 5200 [Hz]) in the frequency components shifted to the high frequency side is reduced. When the third sound like this is outputted from the speaker 30, a sense of incongruity hardly occurs which is due to the difference (high frequency band) between the tone of the first sound as indicated as an example by the solid line (thin solid line) in FIG. 3A and the tone of the third sound as indicated as an example by the solid line (thick solid line) in FIG. 3C. Thus, the sensing of acceleration feeling is improved.

Figure 3D:
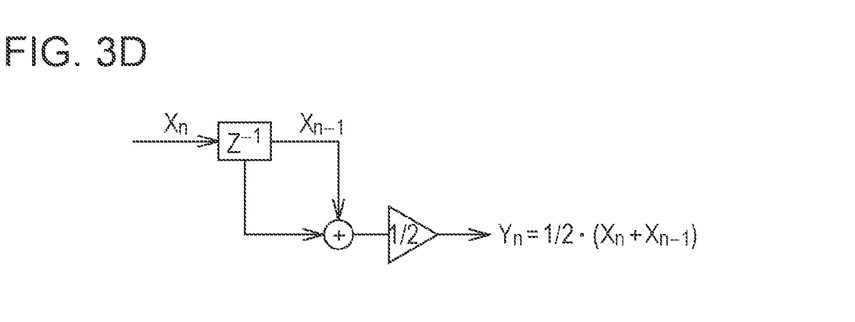
FIG. 3D illustrates a configuration example of the first filter characteristic of FIG. 3B.

FIG. 3D illustrates a configuration example of the first filter characteristic of FIG. 3B. For example, as illustrated in FIG. 3D, the generation unit 11 of FIG. 1 is able to perform low pass filter processing on the sound source data that has undergone pitch shift processing. Specifically, the low pass filter processing is, for example, moving average processing using two points, and $X_n$ (input or input signal) is given by, for example, the dotted line (the second sound which has the frequency characteristics after being shifted to the high frequency side) in FIG. 3C. The generation unit 11 is able to delay $X_n$ by a delay circuit $Z^{-1}$ to obtain $X_{n-1}$. In addition, the generation unit 11 is able to obtain $Y_n$(output) by applying an adder and a divider to $X_n$ and $X_{n-1}$.

It is to be noted that in the generation unit 11, the moving average may be extended, that is, each of the coefficient of $X_n$ and the coefficient of $X_{n-1}$ may be changed to another coefficient except ½, and the low pass filter processing may be finite impulse response (FIR) processing using two points, for example.

In FIG. 3D, the delay time of the delay circuit $Z^{-1}$ is set to, for example, 1/16 [msec] (=0.0625 [msec]). When the generation unit 11 of FIG. 1 performs pitch shift processing and moving average processing on the sound source data, each of the pitch shift processing and the moving average processing is digital processing. However, each of them may be analog processing. When each of the pitch shift processing and the moving average processing is digital processing, the speaker 30, for example, of FIG. 1 may have a D/A converter. The output sampling speed (or output sampling frequency) of the D/A converter is preferably shorter (or higher) than 1/16 [msec] (or 16 [kHz]), thereby making it possible to provide fine quality sound (the third sound). Similarly, the input sampling speed (or input sampling frequency) of the sound source data is also preferably shorter (or higher) than 0.0625 [msec] (or 16 [kHz]).

Figure 4A:
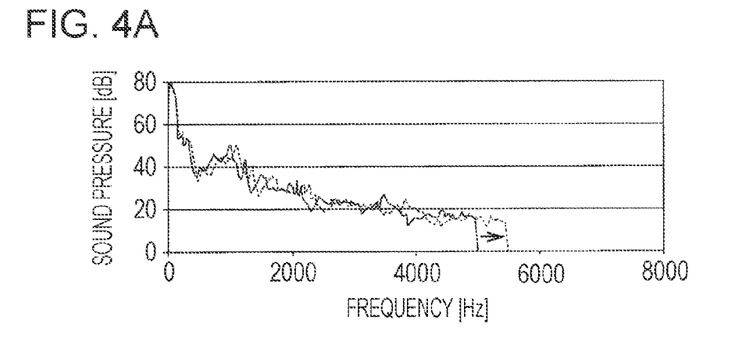
FIG. 4A illustrates respective explanatory diagrams of sound having frequency characteristics before and after being shifted to the high frequency side when the vehicle speed changes from the first speed to a second speed (for example, 15 to 20 [km/h])

FIG. 4A illustrates respective explanatory diagrams of the sound (the sound source data, the first sound) before being shifted to the high frequency side and the sound (the second sound) having the frequency characteristics after being shifted to the high frequency side when the vehicle speed changes from the first speed (for example, 0.5 [km/h]) to the second speed (for example, 15 to 20 [km/h]). The solid line in FIG. 4A matches the solid line in FIG. 3A. That is, the solid line in FIG. 4A indicates the frequency characteristics of the first sound (the sound source data) when the vehicle speed is, for example, 0.5 [km/h] (the first speed=the first threshold value) and the pitch change rate is, for example, 100[%]. Also, the dotted line in FIG. 4A indicates the frequency characteristics of the second sound when the vehicle speed is, for example, 15 [km/h] (the second speed=the third threshold value) and the pitch change rate is, for example, 118[%].

When the vehicle speed is a first high speed (for example, 15 to 20 [km/h]), a sense of incongruity is high which is due to the difference (high frequency band) between the tone of the first sound (the sound before being shifted to the high frequency side) as indicated as an example by the solid line in FIG. 4A and the tone of the second sound (the sound having the frequency characteristics after being shifted to the high frequency side) as indicated as an example by the dotted line in FIG. 4A. Thus, the generation unit 11 does not output the sound (the second sound) as it is, the sound having the frequency characteristics after being shifted to the high frequency side, and the generation unit 11 is able to reduce a high frequency band in the shifted frequency components. Specifically, the generation unit 11 is able to perform filter processing having the filter characteristic for example as illustrated in FIG. 4B on the second sound (the sound having the frequency characteristics after being shifted to the high frequency side).

Figure 4B:
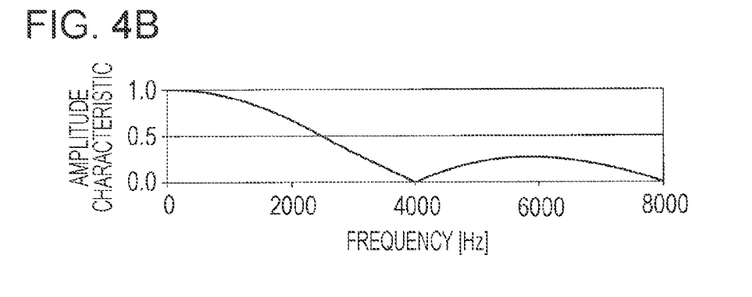
FIG. 4B illustrates a second filter characteristic.
Figure 4C:
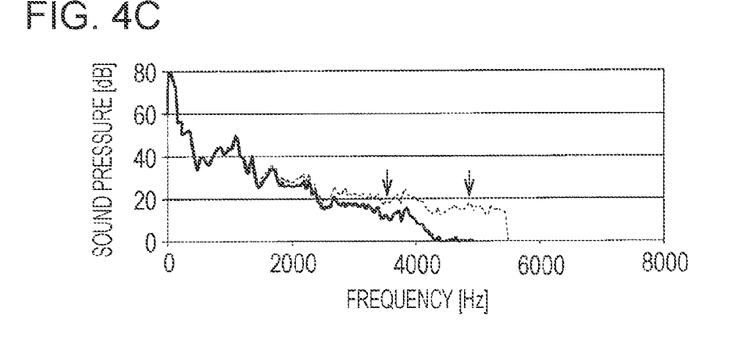
FIG. 4C illustrates respective explanatory diagrams of sound having frequency characteristics before and after undergoing filter processing when the vehicle speed changes from the first speed to the second speed.

FIG. 4B illustrates a second filter characteristic, and FIG. 4C illustrates respective explanatory diagrams of the sound (the second sound which has the frequency characteristics after being shifted to the high frequency side) having frequency characteristics before undergoing filter processing and the sound (the third sound which is shifted to the high frequency side and has frequency characteristics after undergoing filter processing) having the frequency characteristics after undergoing filter processing when the vehicle speed changes from the first speed (for example, 0.5 [km/h]) to the second speed (for example, 15 to 20 [km/h]). Here, the dotted line in FIG. 4C matches the dotted line in FIG. 4A. The solid line (thick solid line) in FIG. 4C indicates the frequency characteristics of the third sound when the vehicle speed is, for example, 15 [km/h] (the second speed=the third threshold value), the pitch change rate is, for example, 118[%], and the filter characteristic is, for example, the second filter characteristic of FIG. 4B.

For example, as illustrated by the solid line in FIG. 4C, a high frequency band (for example, 1500 to 5200 [Hz]) in the frequency components shifted to the high frequency side is reduced. In other words, when the third sound like this is outputted from the speaker 30, a sense of incongruity is reduced which is due to the difference (high frequency band) between the tone of the first sound as indicated as an example by the solid line (thin solid line) in FIG. 4A and the tone of the third sound as indicated as an example by the solid line (thick solid line) in FIG. 4C.

Figure 4D:
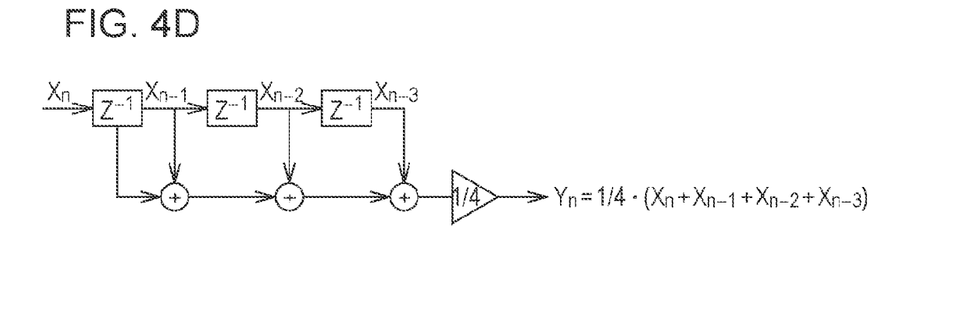
FIG. 4D illustrates a configuration example of the second filter characteristic of FIG. 4B.

FIG. 4D illustrates a configuration example of the second filter characteristic of FIG. 4B. For example, as illustrated in FIG. 4D, the generation unit 11 of FIG. 1 is able to perform low pass filter processing on $X_n$(input) which is sound source data that has undergone pitch shift processing. Specifically, the low pass filter processing is, for example, moving average processing using four points, and the generation unit 11 is able to delay $X_n$ by a plurality of delay circuits $Z^{-1}$ to obtain $X_{n-1}$, $X_{n-2}$, and $X_{n-3}$. In addition, the generation unit 11 is able to obtain $Y_n$(output) by applying, for example, three adders and one divider to $X_n$, $X_{n-1}$, $X_{n-2}$, and $X_{n-3}$.

The low pass filter processing may be, for example, moving average processing or FIR processing using three points. In other words, when the first filter characteristic of FIG. 3B is achieved by moving average processing using two points, the second filter characteristic of FIG. 4B may be achieved by, for example, moving average processing using at least three points.

Figure 5A:
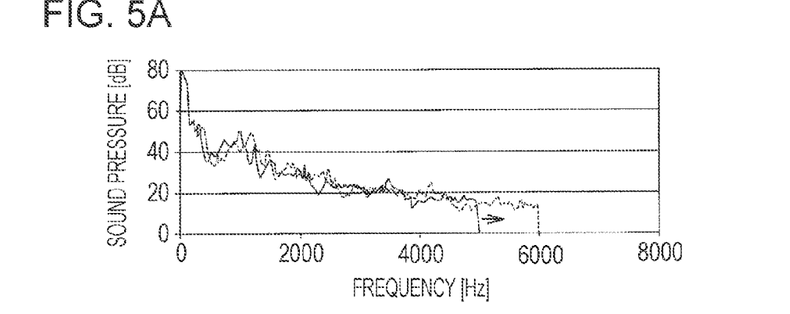
FIG. 5A illustrates respective explanatory diagrams of sound having frequency characteristics before and after being shifted to the high frequency side when the vehicle speed changes from the first speed to a second speed (for example, 20 to 25 [km/h])

FIG. 5A illustrates respective explanatory diagrams of the sound (the sound source data, the first sound) before being shifted to the high frequency side and the sound (the second sound) having the frequency characteristics after being shifted to the high frequency side when the vehicle speed changes from the first speed (for example, 0.5 [km/h]) to the second speed (for example, 20 to 25 [km/h]). The solid line in FIG. 5A matches the solid line in FIGS. 3A and 4A. Also, the dotted line in FIG. 5A indicates the frequency characteristics of the second sound when the vehicle speed is, for example, 20 [km/h] (the second speed=the fourth threshold value) and the pitch change rate is, for example, 124[%].

When the vehicle speed is a second high speed (for example, 20 to 25 [km/h]), a sense of incongruity is even higher which is due to the difference (high frequency band) between the tone of the first sound (the sound before being shifted to the high frequency side) as indicated as an example by the solid line in FIG. 5A and the tone of the second sound (the sound having the frequency characteristics after being shifted to the high frequency side) as indicated as an example by the dotted line in FIG. 5A. Thus, the generation unit 11 is able to further reduce a high frequency band in the frequency components shifted to the high frequency side. Specifically, the generation unit 11 is able to perform filter processing having the filter characteristic for example as illustrated in FIG. 5B on the second sound (the sound having the frequency characteristics after being shifted to the high frequency side).

Figure 5B:
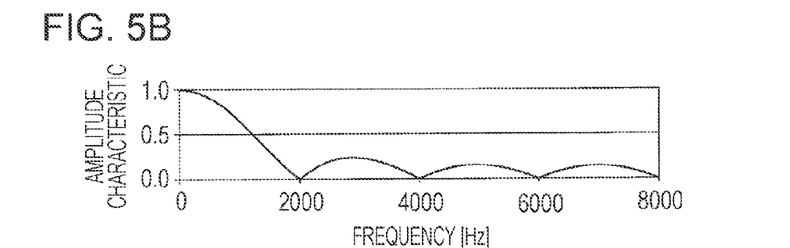
FIG. 5B illustrates a third filter characteristic.
Figure 5C:
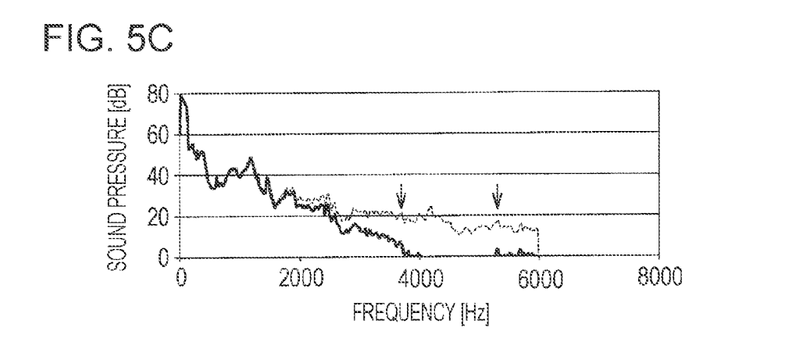
FIG. 5C illustrates respective explanatory diagrams of sound having frequency characteristics before and after undergoing filter processing when the vehicle speed changes from the first speed to the second speed.

FIG. 5B illustrates a third filter characteristic, and FIG. 5C illustrates respective explanatory diagrams of the sound (the second sound which has the frequency characteristics after being shifted to the high frequency side) having frequency characteristics before undergoing filter processing and the sound (the third sound which is shifted to the high frequency side and has frequency characteristics after undergoing filter processing) having the frequency characteristics after undergoing filter processing when the vehicle speed changes from the first speed (for example, 0.5 [km/h]) to the second speed (for example, 20 to 25 [km/h]). Here, the dotted line in FIG. 5C matches the dotted line in FIG. 5A. The solid line (thick solid line) in FIG. 5C indicates the frequency characteristics of the third sound when the vehicle speed is, for example, 20 [km/h] (the second speed=the third threshold value), the pitch change rate is, for example, 124[%], and the filter characteristic is, for example, the third filter characteristic of FIG. 5B.

For example, as illustrated by the solid line in FIG. 5C, a high frequency band (for example, 1200 to 5200 [Hz]) in the frequency components shifted to the high frequency side is further reduced. In other words, when the third sound like this is outputted from the speaker 30, a sense of incongruity is further reduced which is due to the difference (high frequency band) between the tone of the first sound as indicated as an example by the solid line (thin solid line) in FIG. 5A and the tone of the third sound as indicated as an example by the solid line (thick solid line) in FIG. 5C.

Figure 5D:
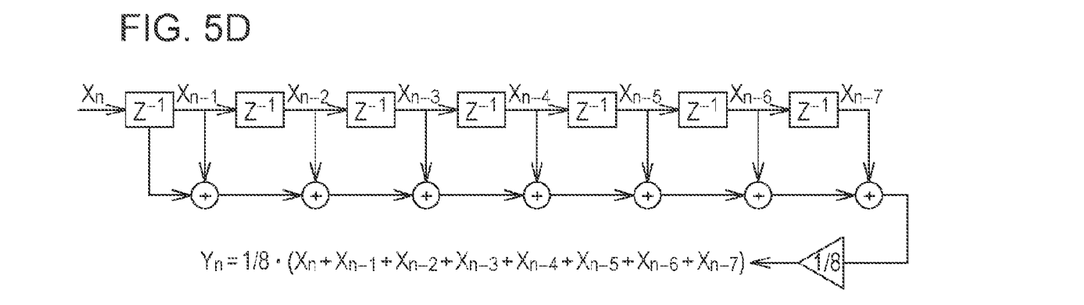
FIG. 5D illustrates a configuration example of the third filter characteristic of FIG. 5B.

FIG. 5D illustrates a configuration example of the third filter characteristic of FIG. 5B. For example, as illustrated in FIG. 5D, the generation unit 11 of FIG. 1 is able to perform low pass filter processing on $X_n$(input) which is sound source data that has undergone pitch shift processing. Specifically, the low pass filter processing is, for example, moving average processing using eight points, and the generation unit 11 is able to delay $X_n$ by a plurality of delay circuits $Z^{-1}$ to obtain $X_{n-1}$, $X_{n-2}$, $X_{n-3}$, $X_{n-4}$, $X_{n-5}$, $X_{n-6}$, and $X_{n-7}$. In addition, the generation unit 11 is able to obtain $Y_n$(output) by applying, for example, seven adders and one divider to $X_n$, $X_{n-1}$, $X_{n-2}$, $X_{n-3}$, $X_{n-4}$, $X_{n-5}$, $X_{n-6}$, and $X_{n-7}$.

The low pass filter processing may be, for example, moving average processing or FIR processing using five points. In other words, when the second filter characteristic of FIG. 4B is achieved by moving average processing using four points, the third filter characteristic of FIG. 5B may be achieved by, for example, moving average processing using at least five points. In addition, the number (for example, "2") used in the moving average processing of FIG. 3B, the number (for example, "4") used in the moving average processing of FIG. 4B, and the number (for example, "8") used in the moving average processing of FIG. 5B may be set in consideration of the input sampling speed (or the input sampling frequency) of the sound source data (the first sound) and a maximum value (for example, "130[%]") of the pitch change rate of FIG. 2.

Figure 6:
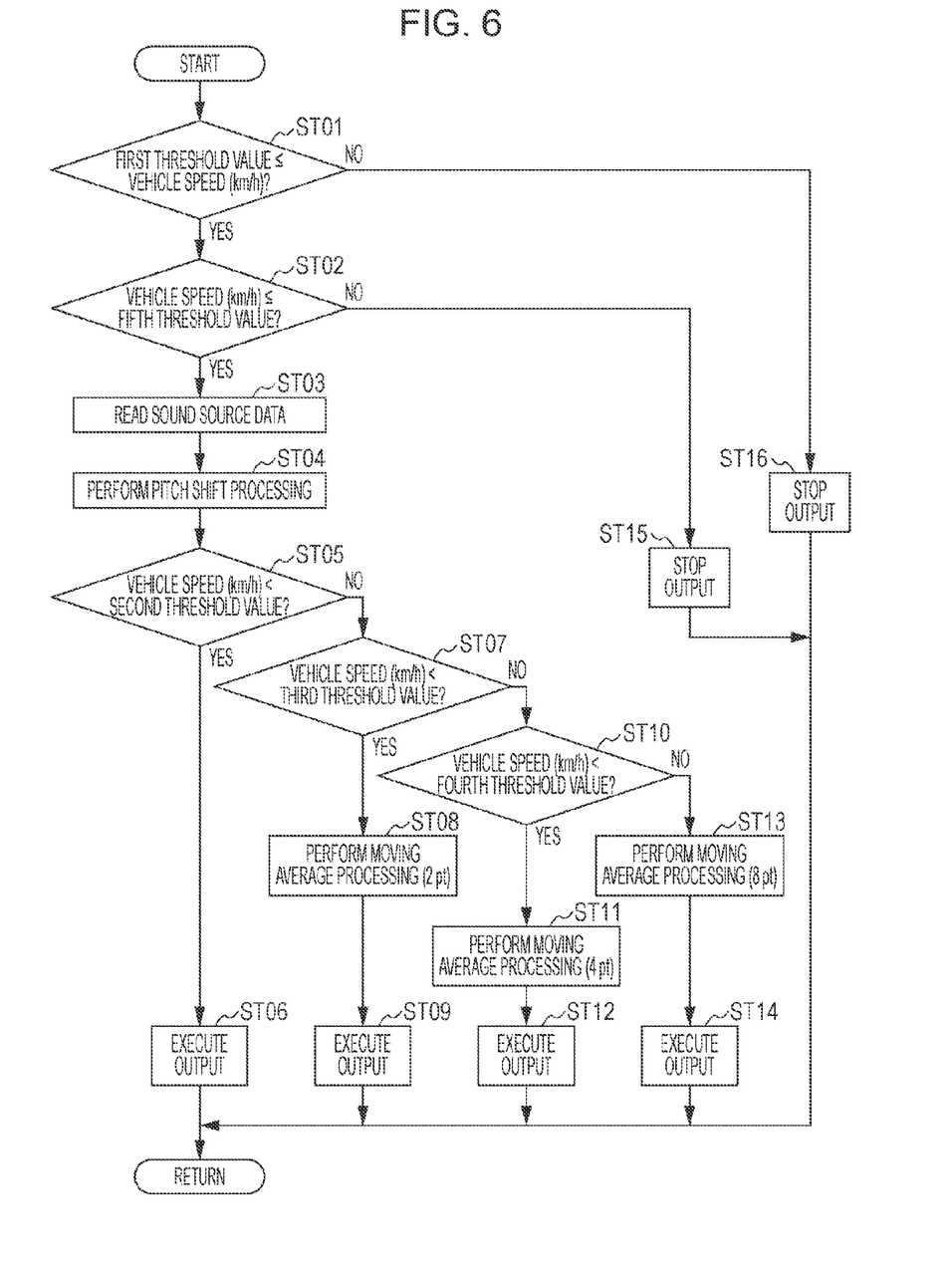
FIG. 6 is a flow chart illustrating the operation of the sound generating device for vehicles of FIG. 1.

FIG. 6 is a flow chart illustrating the operation of the sound generating device 10 for vehicles of FIG. 1. The generation unit 11 of the sound generating device 10 for vehicles receives an input of the vehicle speed from the vehicle speed sensor 20 via the I/O interface 12 as an input unit. The sound generating device 10 for vehicles is, for example, an ECU including a microcomputer, and the generation unit 11 (for example, processing unit such as a CPU of the ECU) is able to receive an input of the vehicle speed every 1/16 [msec], for example. Next, the generation unit 11 is able to determine whether or not the vehicle speed is higher than or equal to the first threshold value (for example, 0.5 [km/h]) (step ST01 of FIG. 6). When the vehicle speed is higher than or equal to the first threshold value (for example, 0.5 [km/h]), the generation unit 11 is able to determine whether or not the vehicle speed is higher than or equal to a fifth threshold value (for example, 25 [km/h]) (step ST02 of FIG. 6). Naturally, the generation unit 11 may determine whether or not the vehicle speed is in a predetermined range (for example, 0.5 to 25 [km/h]). The generation unit 11 may be implemented by a computer or a hardware processor which executes a program stored in a memory device to implement several functions. Also, the generation unit 11 may be implemented by a hardware circuitry.

Next, the generation unit 11 is able to read sound source data (step ST03 of FIG. 6). Here, the sound source data is stored in a storage unit (saving area) such as an EEPROM of the ECU, but may be stored in a storage unit of another device provided externally of the sound generating device 10 for vehicles. For example, externally stored data may be read via wired or wireless network. In addition, the generation unit 11 is able to take sound source data into, for example, a storage unit (working area) such as a SRAM of the ECU and to perform pitch shift processing on the sound source data (step ST04 of FIG. 6). Here, the pitch change rate of the pitch shift processing depends on the vehicle speed (see FIG. 2). Thus, when the speaker 30 of FIG. 1 outputs or reproduces sound source data which has undergone pitch shift processing, the sound from the speaker 30 is shifted to the high frequency side and acceleration feeling regarding the sound (or accelerating vehicle) is improved (see step ST06, ST09, ST12, and ST14 of FIG. 6).

However, when the vehicle speed is higher than or equal to the second threshold value (for example, 10 [km/h]), the generation unit 11 is able to perform pitch shift processing and moving average processing on the sound source data (see step ST08, ST11, and ST13 of FIG. 6). Specifically, as the difference between the first speed and the second speed increases, the generation unit 11 is able to further reduce a high frequency band in the frequency components shifted to the high frequency side (see step ST08, ST11, ST13 of FIG. 6, FIG. 3C, FIG. 4C, and FIG. 5C), the first speed being the vehicle speed (for example, 0.5 [km/h]) when the pitch change rate is, for example, 100[%], the second speed being the current vehicle speed (the speed used in step ST01, ST02, ST05, ST07, and ST10 of FIG. 6). As the difference between the first speed and the second speed increases, that is, as the speed (the current vehicle speed) used in step ST01, ST02, ST05, ST07, and ST10 of FIG. 6 increases, the generation unit 11 is able to increase the sampling number (for example, "two points (2 pt)", "four points (4 pt)", "eight points (8 pt)") used in moving average processing (the speed used in step ST08, ST11, and ST13 of FIG. 6). In this manner, when the current vehicle speed (the second speed) increases, the width of reduced high frequency band may be easily increased.

When the current vehicle speed is in a predetermined range (for example, 0.5 to 25 [km/h]), the speaker 30 of FIG. 1 is able to output or reproduce sound or Yn, for example, every 1/16 [msec], the sound or $Y_n$ being generated in one of step ST06, step ST09, step ST12, and step ST14 of FIG. 6.

The present disclosure is not limited to the above-described illustrative embodiment, and those skilled in the art may easily modify the above-described illustrative embodiment in a scope covered by the appended claims.

We claim:
1. A sound generating device for a vehicle, comprising:
an input unit that receives an input of a speed of the vehicle; and
a generation unit that generates a sound including a plurality of frequency components when the speed of the vehicle is a first speed,
wherein the generation unit is configured to determine when the speed of the vehicle changes from the first speed to a second speed which is higher than the first speed, and when the speed changed, the generation unit shifts the frequency components to a higher frequency side of the frequency components and reduces the sound at a higher frequency band in the shifted frequency components, wherein the generation unit increases a width of the higher frequency band subject to the sound reduction as a difference between the first speed and the second speed becomes larger.

2. The sound generating device for the vehicle according to claim 1,
wherein the generation unit shifts the frequency components to the higher frequency side by performing pitch shift processing on the sound.

3. The sound generating device for the vehicle according to claim 1,
wherein the generation unit reduces the sound at the higher frequency band in the shifted frequency components by performing low pass filter processing on the sound.

4. The sound generating device for the vehicle according to claim 3,
wherein the low pass filter processing is a moving average processing.

5. The sound generating device for the vehicle according to claim 1, wherein the higher frequency band subject to the sound reduction includes a highest frequency in the shifted frequency components.

6. A vehicle comprises the sound generating device according to claim 1.

7. The sound generating device for the vehicle according to claim 1, wherein the generation unit is configured to determine when the speed of the vehicle changes from the first speed to a second speed which is higher than the first speed, and when the speed changed, the generation unit shifts the frequency components to a higher frequency side of the frequency components and reduces the sound at a higher frequency band in the shifted frequency components greater than the sound at a lower frequency band in the shifted frequency components.

8. A sound generating device for a vehicle, comprising:
an input unit that receives an input of a speed of the vehicle: and
a generation unit that generates a sound including a plurality of frequency components when the speed of the vehicle is a first speed,
wherein the generation unit is configured to determine when the speed of the vehicle changes from the first speed to a second speed which is higher than the first speed, and when the speed changed, the generation unit shifts the frequency components to a higher frequency side of the frequency components and reduces the sound at a higher frequency band in the shifted frequency components,
wherein the generation unit reduces the sound at the higher frequency band in the shifted frequency components by performing low pass filter processing on the sound,
wherein the low pass filter processing is a moving average processing, and
wherein the generation unit increases a sampling number used in the moving average processing as a difference between the first speed and the second speed becomes larger.

9. A sound generating device for a vehicle, comprising:
an input interface that receives an input of a speed of the vehicle; and
a sound generator that generates a sound including a plurality of frequency components when the speed of the vehicle is a first speed,
wherein the sound generator is configured to determine when the speed of the vehicle changes from the first speed to a second speed which is higher than the first speed, and when the speed changed, the generator shifts the frequency components to a higher frequency side of the frequency components and reduces the sound at a higher frequency band in the shifted frequency components greater than the sound at a lower frequency band in the shifted frequency components.

10. The sound generating device for the vehicle according to claim 9,
wherein the generator increases a width of the higher frequency band subject to the sound reduction as a difference between the first speed and the second speed becomes larger.

11. The sound generating device for the vehicle according to claim 9,
wherein the generator shifts the frequency components to the higher frequency side by performing pitch shift processing on the sound.

12. The sound generating device for the vehicle according to claim 9,
wherein the generator reduces the sound at the higher frequency band in the shifted frequency components by performing low pass filter processing on the sound.

13. The sound generating device for the vehicle according to claim 12, wherein the low pass filter processing is a moving average processing.

14. The sound generating device for the vehicle according to claim 13,
wherein the generator increases a sampling number used in the moving average processing as a difference between the first speed and the second speed becomes larger.

15. The sound generating device for the vehicle according to claim 9, wherein the higher frequency band subject to the sound reduction includes a highest frequency in the shifted frequency components.

16. A vehicle comprises the sound generating device according to claim 9.

* * * * *